Feb. 9, 1971     G. CROXSON     3,561,068
FASTENERS

Filed March 14, 1969     2 Sheets-Sheet 1

Inventor
Gordon Croxson

By Robert W. Beart
Attorney

Feb. 9, 1971  G. CROXSON  3,561,068
FASTENERS
Filed March 14, 1969  2 Sheets-Sheet 2
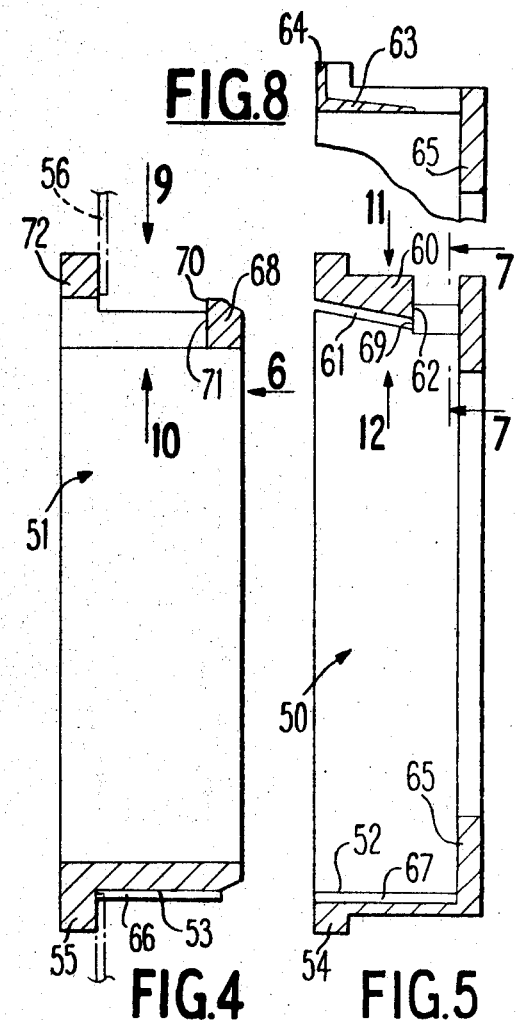
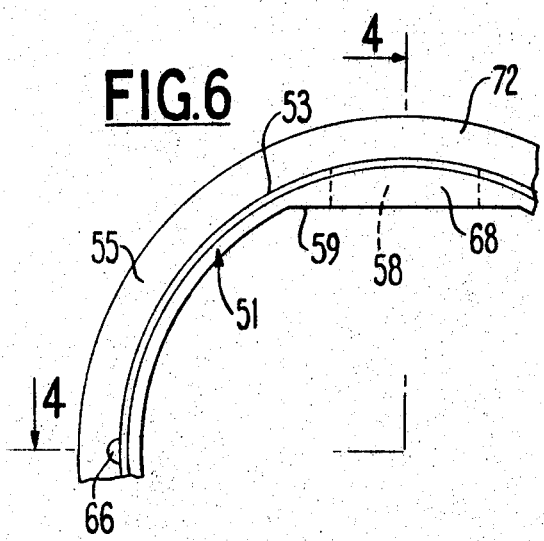
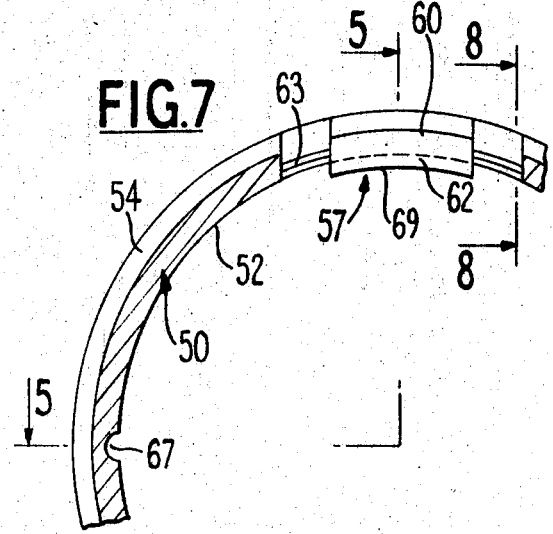
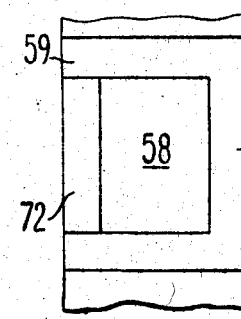
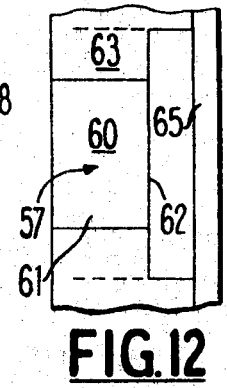
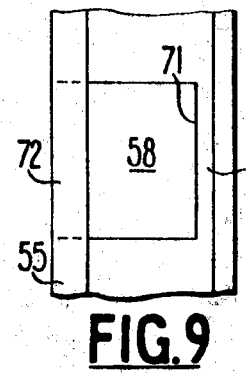
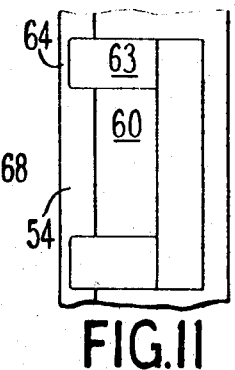
Inventor
Gordon Croxson
By Robert W. Beach
Attorney

United States Patent Office 3,561,068
Patented Feb. 9, 1971

3,561,068
FASTENERS
Gordon Croxson, High Wycombe, England, assignor to Illinois Tool Works Inc., Chicago, Ill., a corporation of Delaware
Filed Mar. 14, 1969, Ser. No. 807,225
Claims priority, application Great Britain, Mar. 19, 1968, 13,274/68
Int. Cl. F16b *19/00;* G12b *9/00*
U.S. Cl. 24—73   5 Claims

ABSTRACT OF THE DISCLOSURE

This invention relates to a plastic snap fastener having a head for engaging one side of an apertured panel and a shank carrying resilient shoulder members for engaging the opposite side of a panel. The resilient members include variable thickness webs which decrease in thickness from a maximum abreast the start of the entering face to a minimum abreast the retaining face of the resilient members. The webs control and provide a reliable snap action to the fastener.

---

This invention relates to fasteners made of a plastics material, including a shank or socket for telescopic assembly with another component, the shank or socket having a portion movable transversely to the direction of assembly so as to exert a snap retaining action on the other component.

The invention is concerned with providing reliable snap action, bearing in mind that those plastics materials which are commonly used for fasteners, for example polypropylene and nylon, have resilient properties which are less definite than those of metals.

In fasteners according to this invention, the movable portion includes a central part having an inclined entering face and a retaining face, for cooperation with the other component, and two resilient supporting parts, one on each side of the central part, which connect the central part to the remainder of the shank or socket; the characteristic feature of this invention is that the supporting parts have the form of webs which lie substantially in a common plane which is parallel to the direction of assembly and perpendicular to the direction of movement of the portion, each web having a substantial dimension in the direction of assembly.

The phrase "substantially in a common plane" is intended to include the possibility that the shank or socket has a circular or arcuate shape, as viewed in the direction of assembly, with the webs following the curvature.

Preferably each web decreases in thickness from a maximum abreast of the start of the entering face to a minimum abreast of the retaining face.

Figure 1:
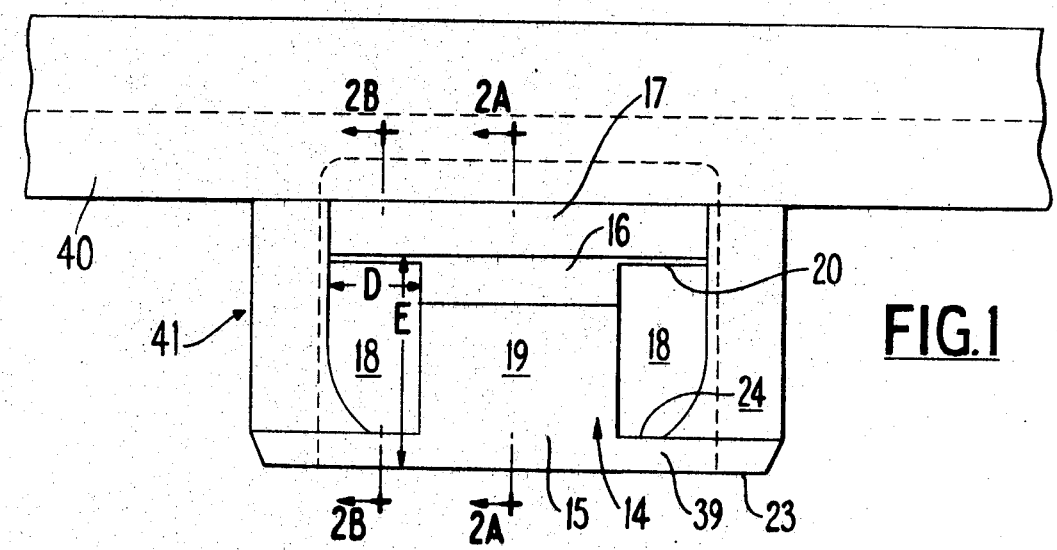
Figure 3:
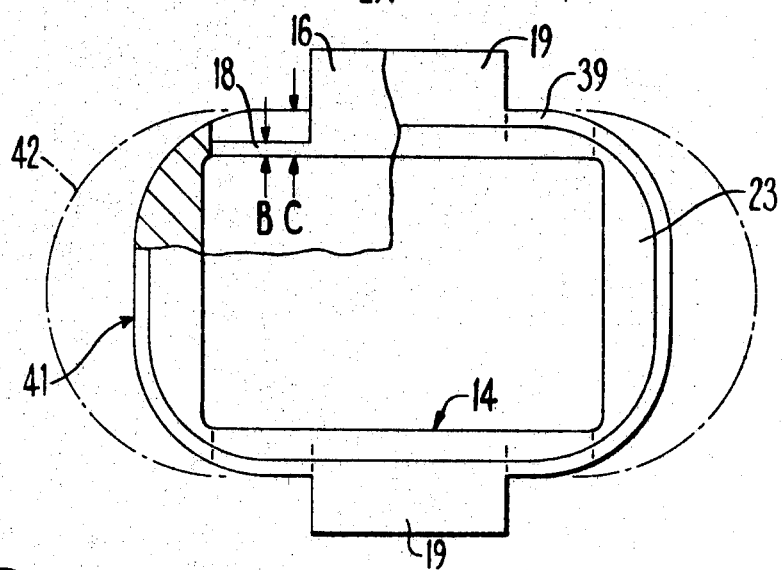
Figure 2:
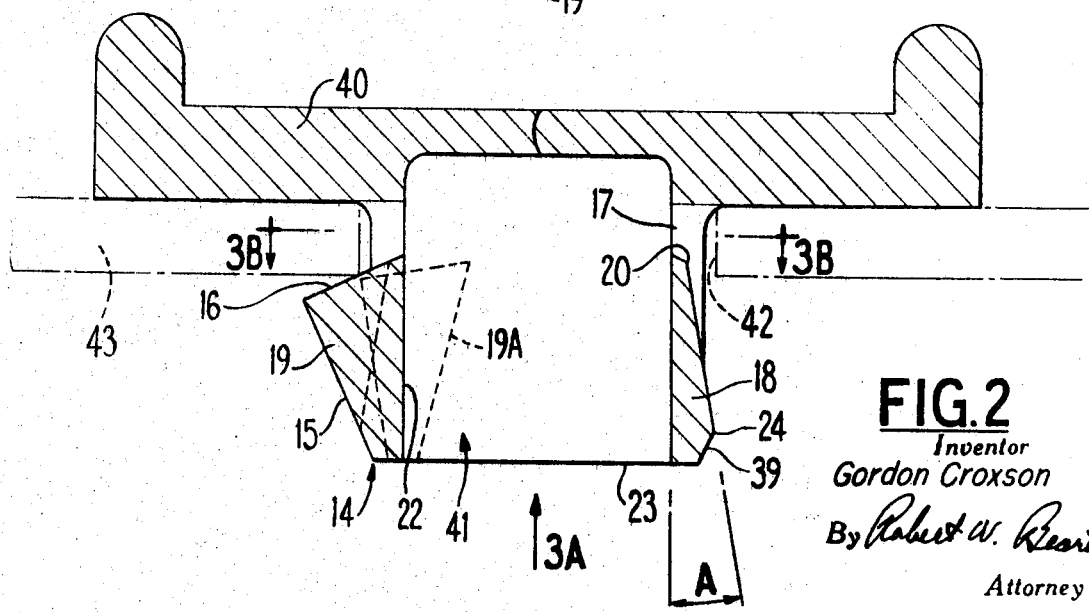

Two examples of fasteners according to the invention will now be described with reference to the accompanying drawings, in which:

FIG. 1 is a side elevation of one fastener;
FIG. 2 is a cross section, the left half being on the line 2A—2A in FIG. 1, and the right half on the line 2B—2B;
FIG. 3 is a view from below, in the direction of the arrow 3A in FIG. 2, except that the top left part is a section, viewed from above, on the line 3B—3B in FIG. 2;
FIG. 4 is a section of a sleeve, on the line 4—4 in FIG. 6;
FIG. 5 is a section of a second fastener, to fit over the sleeve, the section being on the line 5—5 in FIG. 7;
FIG. 6 is an end view of the sleeve, in the direction of the arrow 6 in FIG. 4;

FIG. 7 is a section of the second fastener, on the line 7—7 in FIG. 5;
FIG. 8 is a scrap section on the line 8—8 in FIG. 7;
FIGS. 9 and 10 are fragmentary views, as indicated by the arrows 9, 10 in FIG. 4; and
FIGS. 11 and 12 are fragmentary views, as indicated by the arrows 11, 12 in FIG. 5.

Referring to FIGS. 1 to 3, the fastener is made of polypropylene and comprises a strip-like head 40 and a shank 41 extending from the head. Nylon or other resilient thermoplastic material could be used. The head 40 may be part of a lengthy strip which has a series of shanks 41 projecting from it at intervals.

The shank 41 is adapted to be inserted with a snap action into an aperture 42 (FIG. 3) in a panel 43 (FIG. 2). The shank 41 is generally of hollow box section with curved corners and is provided on two opposite sides with portions 14 which perform the snap action. These portions 14 are best seen in FIG. 3, and each includes a central part 19, having an inclined entering face 15 and an inclined retaining face 16. An aperture 17 extends through each side of the shank, between the portion 14 and the head 40.

Each central part 19 is connected by two resilient supporting parts 18 to the remainder of the shank. These supporting parts have the form of webs. In this example, each central part 19 and its associated two webs 18 have a common flat inner face 22 parallel to the central axis of the shank, and hence to the direction of assembly of the fastener with the aperture. Each web 18 has an inclined entering face 39 of short axial extent which is part of a bevel all round the entering end 33 of the shank. As a matter of convenience, this bevel is at the same angle as the entering face 15 of the central part 19. From a maximum thickness at 24, abreast of the effective start of the entering face 15 of the central part, each web then decreases in thickness to a minimum at 20 abreast of the retaining face 16 of the central part.

In use, as the shank is inserted through the aperture 42 in the panel 43, the entering faces 15 engage opposite sides of the aperture, and the central parts 19 are progressively deflected inwards until their points of greatest thickness move behind the panel 13 with a snap action to bring the retaining faces 16 into engagement with the panel. As each central part 19 is deflected inwards, the supporting parts 18 undergo a combination of bending and torsion. The approximate position of maximum deflection of the central part is indicated at 19A in FIG. 2. Preferably, as in this example, the webs are made of non-uniform thickness, as this produces a particularly satisfactory progression of the stiffness of the whole portion 14 as it passes through the aperture 42. Furthermore, there is a satisfactory ability of the portion 14 to return resiliently to approximately its unstressed shape when the point 20 passes behind the panel 43, so that an adequate overlap occurs of the retaining face 16 behind the panel.

The proportions as shown for the webs 18 are those preferred. The web thickness tapers at an angle A (FIG. 2) of about 10°, and the minimum thickness B (FIG. 3) is about one third of the maximum thickness C. The dimension D (FIG. 1) of each web away from the central part 19 is about half its dimension E in the direction of assembly. In this example, the thickness C is 0.030 inch and the dimension D is 0.065 inch.

FIGS. 4 to 12 show a second fastener 50 in the form of a socket to fit over a sleeve 51. The fastener has a cylindrical bore 52 which is a sliding fit on the exterior 53 of the sleeve. The fastener and the sleeve each have an external flange, 54, 55, and may for example grip a panel 56 (FIG. 4) between them.

The fastener has two inwardly-facing movable portions 57 to exert a snap retaining action in windows 58 in the sleeve. Each window lies between a portion 68 of the sleeve and a portion 72 of the flange 55. To facilitate moulding, the portion 72 has an internal curved surface aligned with the external surface of the sleeve proper. The interior of the sleeve is flattened at 59 in the neighbourhood of each window, to strengthen it.

Each movable portion consists of a central part 60 having an inclined inner entering face 61, and a retaining face 62 perpendicular to the axis. The central part is connected to the rest of the fastener by supporting parts 63 at each side, in the form of webs. Each web 63 has a part-cylindrical inner face, coincident with the bore 52 of the fastener, and (as shown particularly in FIG. 8) decreases in thickness in the axial direction from abreast the start of the entering face 61 to abreast the retaining face 62. The flange 54 is reduced in thickness at 64 in line with each web, but the fastener itself is stiffened by an internal flange 65.

In use, the fastener and sleeve are aligned angularly by splines 66 and grooves 67, and are pushed axially together. Each central part 60 is deflected outwards by the portion 68 of the sleeve, until the inner corner 69 of the central part 60 passes the corner 70 of the portion 68, whereupon the torsional and bending loads in the webs 63 urge the central part 60 inwards so that the retaining face engages the face 71 of the portion 68.

As alternatives to the examples shown, for some uses, the webs 18 or 63 may be made of uniform thickness, substantially equal to the minimum thicknesses of the webs shown in the drawings. This gives greater flexibility and less forcible return of the portion 14, where desired. Alternatively the tops of the webs 18 may be lower than the top of the portion 14; that is to say the dimension E is reduced.

I claim:

1. A fastener made of a plastics material, including a shank for telescopic assembly with another component, the shank having a portion movable transversely to the direction of assembly so as to exert a snap retaining action on the other component, this portion including a central part having an inclined entering face and a retaining face, for cooperation with the other component, and two resilient supporting parts, one on each side of the central part, which connect the central part to the remainder of the shank, characterised by the supporting parts having the form of webs which lie substantially in a common plane which is parallel to the direction of assembly and perpendicular to the direction of movement of the portion, each web having a substantial dimension in the direction of assembly and decreasing in thickness from a maximum abreast of the start of the entering face to a minimum abreast of the retaining face.

2. A fastener according to claim 1, in which the web thickness tapers at an angle of about 10°, and the minimum thickness is about one third of the maximum thickness.

3. A fastener according to claim 1 in which the dimension of each web away from the central part is about half its dimension in the direction of assembly.

4. A fastener according to claim 1 in which the movable portion extends laterally outwardly from the shank.

5. A fastener according to claim 1 in which the shank is provided with a through bore throughout its extent and the movable portions extend inwardly into said bore to cooperate with shoulder means on said other components when said other components are inserted within the bore of said shank.

References Cited
UNITED STATES PATENTS

| | | | |
|---|---|---|---|
| 2,941,235 | 6/1960 | Schwartz et al. | 24—214X |
| 3,227,992 | 1/1966 | Strong | 248—27X |
| 3,393,431 | 7/1968 | Saunders | 24—73PF |
| 3,412,437 | 11/1968 | Bennett | 24—73PF |

FOREIGN PATENTS

| | | | |
|---|---|---|---|
| 1,211,073 | 10/1959 | France | 85—5 |
| 1,299,036 | 6/1962 | France | 24—208.3 |

DONALD A. GRIFFIN, Primary Examiner

U.S. Cl. X.R.

85—5; 248—27